May 12, 1959  A. E. VOGEL  2,886,342
STABILIZING APPARATUS FOR VEHICLES
Filed March 15, 1954  2 Sheets-Sheet 1

INVENTOR
Arthur E. Vogel.
BY
Schmieding and Fultz
ATTORNEYS

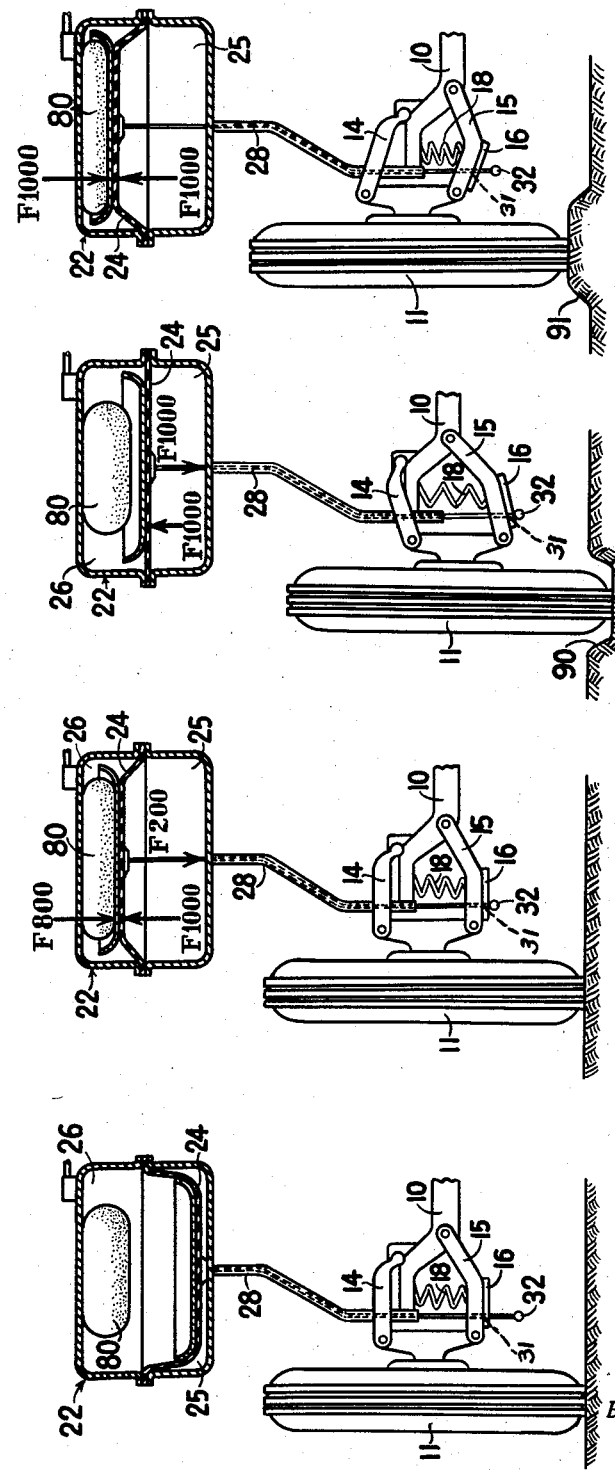

United States Patent Office 2,886,342
Patented May 12, 1959

2,886,342

STABILIZING APPARATUS FOR VEHICLES

Arthur E. Vogel, Columbus, Ohio, assignor, by direct and mesne assignments, of one-half to Dawson-Vogel Engineering Co., Columbus, Ohio, a partnership, one-fourth to Palmer Fultz and one-fourth to Warren H. F. Schmieding, Columbus, Ohio Application March 15, 1954, Serial No. 416,020

12 Claims. (Cl. 280—112)

This invention relates to stabilizing systems of a type which is particularly useful when applied to vehicles, such as automobiles, buses and trucks.

In particular, the present invention relates to an improvement which may be applied to a stabilizing system of the type described in my co-pending application Serial No. 332,651.

The conventional motor vehicle is ordinarily provided with springs between the body and the wheels of the vehicles so that such springs will absorb shocks and jars of the vehicle to provide safer and more comfortable riding for the occupants.

When the vehicle is rounding curves, however, the springs at the wheels on the side of the vehicle nearest to the center of the curve push upward on such side of the vehicle due to the fact that energy is stored in such springs by the normal weight of the vehicle. Such upward spring force helps to disturb the stability or actually upset the vehicle when rounding a curve by augmenting the centrifugal force that is concurrently exerted on the vehicle due to the fact that the vehicle is undergoing a change in direction.

The vehicle stabilizing apparatus, disclosed in my co-pending application Serial No. 332,651, eliminates a force detrimental to stability by decreasing the effect, on the body of the vehicle, of energy normally stored in the springs of the vehicle. The various ways in which the spring effect is decreased include confining, compressing and releasing the spring energy exerted on the body of a vehicle at the side thereof nearest the center of the curve which such is rounding.

Further advantages of this type of stabilizing apparatus include lowering of the center of gravity of the vehicle in curves, increased traction at desired wheels, and concurrent operation with conventional shock absorbers.

It is an object of the present invention to provide a vehicle stabilizing apparatus which decreases the adverse effect of the vehicle springs on stability when the vehicle is in a curve, which stabilizing apparatus concurrently maintains spring action, and hence improved riding qualities, for the vehicle when in a curve.

It is another object of the present invention to provide a vehicle stabilizing apparatus which decreases the adverse effect of the vehicle springs on stability when the vehicle is in a curve, which stabilizing apparatus includes means for controlling the rate and intensity at which said decrease, in adverse spring effect, is produced.

Another object of the present invention is to provide a vehicle stabilizing apparatus which decreases the adverse effect of the vehicle springs on stability when the vehicle is in a curve, which stabilizing apparatus is silent when actuated and of smoother operation than prior devices.

Still another object of the present invention is to provide a stabilizing apparatus providing, in addition to the aforementioned advantages, lowering of the center of gravity of the vehicle when in a curve, increased traction at desired wheels, and adaptability to concurrent operation with conventional vehicle shock absorbers.

In rounding a curve with a vehicle equipped with springs the side of the vehicle towards the center of the curve tends to raise due to two major forces exerted on the vehicle. One of such forces is the centrifugal force exerted at the center of gravity which is located above the points of resistance. Frictional force is exerted on the wheels by the road, with such force acting in a direction opposite to that of centrifugal force. Hence the two forces comprise a couple which tends to roll the vehicle about its longitudinal axis and which actually raises the side of the vehicle nearest the center of the curve. The intensity of the centrifugal force varies directly with the mass and the square of velocity of the vehicle and inversely with the radius of the curve about which the vehicle is traveling. Hence it may be seen that the only way a driver can lessen centrifugal force is by decreasing velocity or increasing the radius of turn.

The other force which is of major detriment to stability is the force in the normally compressed springs which pushes upwardly at the side of the vehicle nearest the center of the curve. Such portion of the total upwardly exerted spring force serves to augment centrifugal force in disturbing the stability of a vehicle turning at high velocity.

The present stabilizing apparatus achieves roadability by decreasing the effect of the upwardly exerted spring force at the side of the vehicle nearest the center of the curve which the vehicle is rounding. This spring force, which normally acts adversely in curves, is of considerable magnitude. In conventional vehicles, such force is in excess of a thousand pounds at each wheel. To overcome the detrimental effect due to this adverse spring force, the present apparatus is provided to confine, compress, or release the spring energy normally exerted on the body of a vehicle at the side thereof nearest the center of the curve which such vehicle is rounding.

Further objects and advantages of the present invention will be apparent from the following description, reference being had to the accompanying drawings wherein a preferred form of embodiment of the present invention is clearly shown.

In the drawings:

Fig. 3 is a front diagrammatic view of a vehicle provided with the present invention showing the configuration of the stabilizing apparatus and vehicle suspension system when the vehicle is proceeding in a straight course prior to actuation of the stabilizing apparatus;

Fig. 4 is a diagrammatic view corresponding to Fig. 3 showing the configuration of the stabilizing apparatus and vehicle suspension after the former has been actuated and the vehicle is rounding a curve;

Fig. 5 is a diagrammatic view corresponding to Fig. 4 showing the configuration assumed by the apparatus when a depression in the road is suddenly encountered by the wheel; and Fig. 6 is a diagrammatic view corresponding to Fig. 4, showing the configuration assumed by the apparatus when a protusion in the road is suddenly encountered by the wheel.

Figure 1:
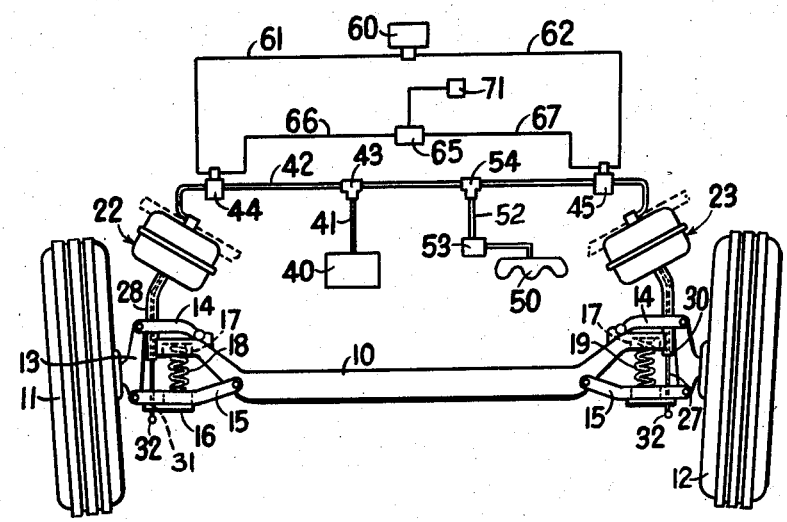
Fig. 1 is a diagrammatic view showing the application of my invention to a motor vehicle wherein such invention is operatively adapted to the front wheel of the vehicle.

Referring to the drawings, and more particularly to Fig. 1, a main body member or frame of a vehicle is indicated generally at 10. Fig. 1 is a view, partially diagrammatic, of the present invention with the wheels and frame appearing essentially as seen from the front of the vehicle. A right front wheel 11 and a left front wheel 12 are provided for the frame or body member 10. Each of such wheels is rotatably mounted on an axle member 13. Two upper links 14 are provided so each pivotally engages the frame and an axle member. In a corresponding manner, two lower links 15 are provided and each pivotally engages the frame and an axle member. The links 14 and 15 serve to mount the wheels to the frame in a manner such that each wheel is free to move essentially vertically relative to such frame. A plate 16 is secured to the underside of each link 15 to serve as a spring retainer. A suitable recess 17 is provided in each side of the frame member 10 for retaining the upper end of a spring. A spring 18 for the right front wheel is retained between the elements 16 and 17. In a like manner, a spring 19 is retained at the left front wheel. With the springs mounted in the manner shown, it will be seen that the springs operatively connect the frame 10 with the respective front wheels 11 and 12. At this point it should be noted that the type of spring and wheel mounting shown in Fig. 1 is illustrative of only one of the possible types of suspensions to which the present invention may be adapted. For example, the invention, herein disclosed, can be adapted to vehicles mounted with transverse leaf type springs, or other types of spring connection between the frame and wheels, instead of the coil type springs shown in Fig. 1.

To selectively confine the springs 18 and 19, two power cylinders 22 and 23 are provided. These cylinders may be mounted at any suitable place on the vehicle. Each of the power cylinders 22 and 23 is adapted to apply force to a cable 27, in a manner later to be described, and each power cylinder and its cable constitutes a yieldable connection engageable and disengageable between the sprung and unsprung weights of the vehicle. Each power cylinder and its respective cable is adapted to maintain a decrease in the effect of the force exerted by the vehicle spring between the sprung and unsprung weights. The connecting means between the sprung and unsprung weights, formed by the power cylinder and its respective cable, is provided with a suitable control system, later to be described in detail herein for automatically selectively engaging and disengaging such connecting means.

Figure 2:
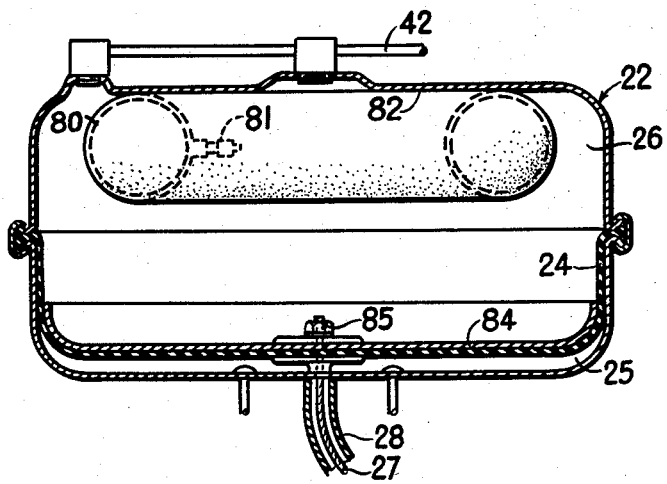
Fig. 2 is a sectional view of a vacuum cylinder comprising a portion of the apparatus according to the present invention, with the section being taken substantially along a vertical plane passing through the center of the vacuum cylinder.

Referring particularly to Fig. 2, the interior of one of the power cylinders 22 is shown in detail. It will be understood that the other power cylinder 23 includes identical interior structure. As seen in Fig. 2, the power cylinder includes a diaphragm 24 separating a lower chamber 25 and an upper chamber 26. A flexible cable 27 is provided with its upper end secured to the diaphragm 24. Hence when the air pressure is decreased in upper chamber 26, diaphragm 24 will move upwardly applying tension to cable 27. A cable housing 28 is fastened at its upper end to the cylinder 22 and at its lower end to the frame 10. The cable 27 is of greater length than the cable housing 28 so that such cable extends out through the end of the housing and down through a hole 31 in the plate 16. A bead 32 is provided on the end of each of the cables 27 and this bead is made of larger diameter than the hole 31 so that when the cable 27 is pulled upwardly due to movement of the diaphragm 24, the bead 32 will engage the plate 16.

Upon engagement of plate 16 by bead 32, unloading of the spring energy stored in spring 18 will be prevented, or decreased, depending on the total force exerted by power cylinder 22 as compared to the total force exerted by the spring.

It will be understood that depending on the total length of cable 27, the portion of the lower end of the cable 27 which extends below plate 16, i.e. the distance between bead 32 and plate 16, will vary.

By selecting a suitable length of cable 27, this apparatus can be adapted to completely compress spring 18, or partially compress such spring any predetermined amount beyond its normal load, partially compressed, configuration. The apparatus can likewise be adapted to confine the spring at its normal load configuration, or release the spring any predetermined amount. It will be understood that the compressing confining, or releasing of the spring can be effected at a selected spring, and which the vehicle is rounding a curve, by suitable control mechanism adapted to selectively energize and deenergize the power cylinder 22 or 23 at a respective spring such that the connecting means between the sprung and unsprung weights, at the respective spring, provided by a power cylinder 22 or 23 and its respective cable, is selectively engaged and disengaged.

To actuate the power cylinder 22 a vacuum source, in the form of a tank 40, is utilized. It has been found that it is convenient to position the tank 40 in the upper part of the baggage trunk of the vehicle so that such tank will not take up useful space. A line 41 leads from the vacuum tank and joins a line 42 at the T-connection 43, as seen in Fig. 1. This line 42 extends through the valve 44 to engage the chamber 26 of the power cylinder 22. Line 42 similarly extends in the other direction through the valve 45 to the power cylinder 23. In this manner the two vacuum actuated power cylinders are connected to the source of vacuum and the valves 44 and 45 are properly located to selectively control the connecting and disconnecting of the respective power cylinders with the source of vacuum.

To maintain a constant source of vacuum, I prefer to utilize the engine intake manifold, which is a source of low pressure ordinarily present on a motor vehicle. An engine manifold is shown diagrammatically at 50 of Fig. 1. A line 52 extends through a check valve 53 and then to the line 42 at the T-connection 54. The check valve 53 is of a conventional type which is normally closed but which is adapted to open against line pressure. This valve 53, which allows unidirectional flow only, will open whenever the pressure in the vacuum tank becomes greater than the pressure at the intake manifold 50, and when such valve 53 opens, air will be drawn out of the vacuum tank towards the source of lower pressure at the intake manifold. In this manner the pressure in the vacuum tank 40 is continually and automatically maintained at a desired low level. As has been previously stated, actuation of the power cylinder 22 is controlled by opening and closing the valve 44, and likewise, actuation of the other power cylinder 23 is accomplished by opening and closing the valve 45. For this purpose, I prefer to use solenoid operated valves, so that a driver of a vehicle can selectively operate either the valve 44 or the valve 45 by manual actuation of the manual anticipator 60. This anticipator 60 is essentially a three-way switch with a right, a left, and a neutral position. The electrical connection between the manual anticipator 60 and the valve 44 is provided by the wire 61. A similar connection leads to the valve 45 in the form of the wire 62.

To automatically and selectively open the valves 44 and 45, a detector unit 65 is shown connected to the valves 44 and 45, by the lines 66 and 67, respectively. This detector unit 65 utilizes mercury switches, in the preferred embodiment, so that when the vehicle is rounding a curve centrifugal force will operate on the mercury and cause it to make the electrical contact necessary to energize the desired solenoid of the valve. Therefore, if the vehicle is curving to the right and it is desirable to confine energy in the right spring 18 the detector unit 65 will respond to the action of centrifugal force exerted thereon, and energize the solenoid of valve 44 and thereby open such valve so the right power cylinder 22 will be actuated by vacuum. Similarly, when the vehicle is curving to the left, the detector unit 65 will energize the solenoid of the valve 45 and thereby actuate the left power cylinder 23 to confine the spring 19 to the left side of the vehicle. Although I prefer to make the detector unit 65 of the mercury switch type, various other apparatuses which are responsive to the action of centrifugal force can be used. For instance, a pendulum could be used to replace the mercury-type switch.

With the preceding background description having been set forth, an improved power cylinder structure, suitable for use with the present invention, will next be described. Reference is again made to Fig. 2, wherein an element 80 is shown interposed between diaphragm 24 and an under surface 82 of the top wall of power cylinder 22. Element 80 may be formed as a hollow resilient ring-shaped element which may be inflated with air by means of a valve 81. A small pneumatic tire, as illustrated in Fig. 2, has been found to be suitable for element 80. It should be pointed out, however, that although such illustrated forms have been found particularly adaptable, element 80 is in no way limited to such illustrated form.

As diaphragm 24 is formed of flexible material, such as synthetic rubber, a metal plate 84 is provided above diaphragm 24 and cable 27 is secured to plate 84 by suitable fastening means 85. Hence it is seen that transmission of force between the diaphragm 24 and the cable 27 can be effected without rupturing the diaphragm, since the total force is distributed over a large portion of the diaphragm by the large surface of plate 84.

Referring next to Figs. 3 through 6, the operation of the improved apparatus of the present invention will be described. In each of the Figs. 3 through 6 a portion of the same vehicle is schematically illustrated. In general, it should be understood that Fig. 3 illustrates the configuration of the stabilizing apparatus prior to entry of the vehicle into a curve, and, hence, prior to actuation of power cylinder 22. In each of the subsequent Figs. 4, 5 and 6, the same vehicle is rounding a curve; power cylinder 22 has been actuated and various configurations of the improved stabilizing apparatus, corresponding to various road surface conditions encountered, are illustrated.

For purpose of description, the apparatus shown in Figs. 3 through 6 is adapted to confine the spring 18 at approximately normal load configuration upon actuation of the power cylinder 22. That is, the length of cable end, extending between plate 16 and bead 32, is long enough to pull the bead 32 upwardly into contact with plate 16. The linear length of spring 18 is reduced only a slight amount due to the total force applied thereto by power cylinder 22. This condition is illustrated in Fig. 4.

It will be understood, therefore, that a similar operational description, and schematic illustrations thereof, could be readily set forth for aspects of the present apparatus wherein the spring 18 is appreciable or completely compressed. This could be acomplished by decreasing the normal distance of bead 32 extending below plate 16, when the power cylinder is in the non-actuated configuration. A similar description and schematic illustration could also be set forth for aspects of the present apparatus wherein the spring 18 is neither confined at normal load configuration, nor compressed, but wherein spring 18 would be permitted to release, or unload, at a predetermined decreased rate due to action of power cylinder 22.

Referring particularly to Fig. 3, the vehicle is either stationary, or traveling in a straight course. The power cylinder 22 is de-energized such that diaphragm 24 lies in the lower portion of the power cylinder. Hence, no tensile force is applied to cable 27 and bead 32 is spaced from plate 16. It will therefore be understood that as the vehicle progresses along a straight course, spring 18 functions in the conventional manner and wheel 11 can move upwardly and downwardly in response to protrusions and depressions in the road.

Next considering Fig. 4, the vehicle is shown rounding a curve, and the power cylinder 22 is on the side of the vehicle nearest the center of the curve and hence energized. Power cylinder 22 is exerting its maximum force, upwardly, which force will be assigned a magnitude of 1000 lbs. for purposes of this description. Power cylinders of approximately such capacity have been found suitable for conventional passenger vehicles. The total upward power cylinder force of 1000 lbs., is designated F1000 in Fig. 3. This force remains at a constant maximum in the successive Figs. 5 and 6, and hence, is designated F1000 therein. Continuing with the description of Fig. 4, element 80 has been compressed by the upward movement of diaphragm 24. Due to the resiliency of element 80, such element is exerting a downward force of 800 lbs. on diaphragm 24, such force being designated F800 in Fig. 4. As the bead 32 has been drawn upwardly against plate 16 to compress spring 18 a slight amount, spring 18 is exerting a downward force of 200 lbs. (F200) on cable 27, and hence on diaphragm 24. It will therefore be seen that upward force F1000, exerted by power cylinder 22, is opposed by, and in equilibrium with downward force F800 and downward force F200.

In view of the preceding paragraph, and upon study of Fig. 4, it will be understood that power cylinder 22 serves to confine spring 18, and prevent the unloading of the energy stored therein on the vehicle frame 10 when such frame tends to roll outwardly under centrifugal force encountered in rounding a curve. That is, spring 18 is prevented from augmenting the upsetting tendency of inertia forces generated on the vehicle frame when rounding a curve. It will be understood that when the frame 10 starts to roll outwardly, in a curve, the portion of the frame weight borne by spring 18 will be decreased permitting spring 18 to extend slightly. Element 18 will consequently expand to its normal configuration and F800 will become zero. From that point on, the total force F1000, of power cylinder 22, will be expended in confining spring 18 which prevents the stored spring energy from being expended in helping to upset the vehicle.

At the same time power cylinder 22 is serving to confine spring 18 in the manner just described, the wheel 11 is free to move upwardly and downwardly, relative to frame 10, as bumps or depressions in the road are encountered by wheel 11. Referring next to Fig. 5, wherein the vehicle is negotiating the same curve of Fig. 4, it will be seen that wheel 11 has dropped downwardly, suddenly, into a depression 90. The frame 10, due to its inertia, has not yet dropped in response to the drop of wheel 11, such that the inner side of frame 10 is still substantially the same height, above the road surface, as shown in Fig. 4, i.e. the normal height for the side of the frame, towards the center of the curve, for stabilized conditions with power cylinder 22 energized.

With continuing reference to Fig. 5, if depression 90 in the road surface is of sufficient length the inner side of frame 10 will drop downwardly under cushioning action of spring 18. If, however, depression 90 is short in length wheel 11 will return to normal road level under cushioning action of spring 18. Hence it is seen that although power cylinder 22 is energized to confine spring 18 against any appreciable expansion or unloading, wheel 11 is not rigidly locked by the power cylinder but is free to respond to the depressions in the road independently of movement of the frame 10. Moreover, the force F800 exerted downwardly on diaphragm 24 by compressed element 80 serves to augment downward travel of wheel 11, but only for a limited amount of downward wheel travel, i.e. downward travel of the wheel responsive to road depressions. After element 80 has expanded to normal configuration, as shown in Fig. 5, such element no longer exerts any downward force on the diaphragm 24. Hence the total upward force F1000 is rendered adversely on frame 10. This condition is illustrated in Fig. 5 where it will be seen that the total upward vacuum force on the diaphragm 24, is of magnitude F1000. Hence, it will be seen that when the wheel 11 encounters the depression 90, the confining force exerted on spring 18 is progressively increased from a magnitude of F200 in Fig. 4, to a magnitude of F1000 in Fig. 5. This gradual application of the total confining force permits the wheel 11 to respond to uneven road conditions independently of movement of the frame 10. Accordingly superior riding qualities, for the vehicle in a curve, are achieved.

Referring next to Figs. 4 and 6, the change in configuration of the stabilizing apparatus, responsive to wheel 11 encountering a protrusion in the road, will next be described. Immediately subsequent to encountering the protrusion the wheel 11 will rise but frame 10, due to its inertia, will be substantially the same height above the road surface as shown in Fig. 6. Under this condition the downward force of compressed element 80 will be the only force in opposition to the upward vacuum force on diaphragm 24. Since the total potential force of diaphragm 22 has been defined as F1000, for purposes of this description, the downward force exerted by compressed element 80 will necessarily also be F1000 in order to place the force system in equilibrium. The tensile force in cable 27 has become zero since plate 16 has moved upwardly away from bead 32 upon rising of wheel 11.

With continuing reference to Fig. 6, if protrusion 91 is of sufficient length such that wheel 11 continues for some time in the raised position, frame 11, will rise responsive to spring 18. Bead 32 will be engaged by plate 16 and the upward force exerted by power cylinder 22 will gradually be applied to confining spring 18. As frame 10 continues upwardly, this confining force gradually increases, rather than being applied suddenly at full magnitude of F1000, due to the fact that compress-element 80 gradually expands to normal configuration which means that element 80 gradually decreases its opposition to upward vacuum force F1000. Hence, in effect, the upward vacuum force is gradually applied to confining spring 18.

Again considering Fig. 6, if protrusion 91 is of short length such that wheel 11 drops immediately to road level, the plate 16 will be rapidly moved into contact with bead 32. Were the element 80 not present in its compressed configuration, the confining action of the power cylinder 22 would be applied suddenly and at full magnitude of F1000. This condition would be undesirable both from the standpoint of stresses on the system and riding comfort. With the presence of compressed elements 80, however, the effective confining force of spring 18 is at first zero when bead 32 first contacts plate 16, and such confining force gradually increases with expansion of element 80, towards its normal volume.

It will therefore be seen that element 80 provides flexibility for the stabilizing apparatus. Although the spring 18 is confined to prevent unloading of the energy stored therein, such spring is not rigidly confined but free to expand easily, to a limited extent, prior to the application of the full restraint potential of the power cylinder. Hence, it is seen that spring action is maintained when the stabilizing apparatus is energized. Moreover, the rate and intensity at which the spring confinement is produced is automatically controlled. This will be understood by consideration of operation of the apparatus without the presence of element 80. In such instance only the total force F1000 of the power cylinder can be applied to the spring 18. Hence the spring 18 is rigidly confined and wheel 11 is restrained from upward and downward movement, relative to frame 10, when bumps in the road are encountered. Without element 80, power cylinder 24, would function as a rigid, non-yielding lock for confining spring 18. Stability would be achieved since spring 18 would be prevented from unloading energy stored therein, but the riding qualities of the vehicle, in a curve, would be relatively poor without the presence of element 80.

In summary, it will be understood from the present description that the stabilizing apparatus of the present invention serves to confine spring energy normally stored in the springs of a vehicle. Such confinement is effected when the vehicle is in a curve at which time such stored spring energy is detrimental to stability. Moreover, the present apparatus maintains spring action and produces spring confinement with controlled rate and intensity all as set forth in detail herein.

While the form of embodiment of the present invention as herein disclosed constitutes a preferred form, it is to be understood that other forms might be adopted, all coming within the scope of the claims which follow:

I claim:

1. The combination of a vehicle body having supporting wheels and spring means operatively connecting the body with the wheels with stabilizing means for producing a decrease of the effect of the force exerted by said spring means on said body, and means for applying, with increasing magnitude, said decrease of spring effect, said last mentioned means being operatively responsive to road imposed movement of said wheels relative to said body, and inertia responsive means for selectively rendering said stabilizing means operative and inoperative.

2. The combination of a vehicle body having supporting wheels and spring means operatively connecting the body with the wheels with stabilizing means for selectively producing a decrease and a restoration of the effect of the force exerted by said spring means on said body, and means for applying, with increasing magnitude, said restoration of spring effect, said last mentioned means being operatively responsive to road imposed movement of said wheels relative to said body, and inertia responsive means for selectively rendering said stabilizing means operative and inoperative.

3. The combination of a vehicle body having supporting wheels and spring means operatively connecting the body with the wheels with stabilizing means for selectively producing a decrease and a restoration of the effect of the force exerted by said spring means on said body, and means for applying, with increasing magnitude, said decrease of spring effect, said last mentioned means being operatively responsive to road imposed movement of said wheels relative to said body, and to apply, with increasing magnitude, said restoration of spring effect, and inertia responsive means for selectively rendering said stabilizing means operative and inoperative.

4. The combination of a vehicle body having supporting wheels and spring means operatively connecting the body with the wheels, with stabilizing means for applying confinement of said spring means, and means for progressively increasing the magnitude of said confinement, said last mentioned means being operatively responsive to road imposed movement of said wheels relative to said body, and inertia responsive means for selectively rendering said stabilizing means operative and inoperative.

5. The combination of a vehicle body having supporting wheels and spring means operatively connecting the body with the wheels, with stabilizing means for selectively applying and removing confinement of said spring means, and means for progressively decreasing the magnitude of said confinement, said last mentioned means being operatively responsive to road imposed movement of said wheels relative to said body, and inertia responsive means for selectively rendering said stabilizing means operative and inoperative.

6. The combination of a vehicle body having supporting wheels and spring means operatively connecting the body with the wheels, with stabilizing means for selectively applying and removing confinement of said spring means, and means for progressively increasing the magnitude of said confinement and for progressively decreasing the magnitude of said confinement, said last mentioned means being operatively responsive to road imposed movement of said wheel relative to said body, and inertia responsive means for selectively rendering said stabilizing means operative and inoperative.

7. A stabilizing device for a vehicle of the type having a sprung weight portion, an unsprung weight portion, and spring means interposed between said portions, said stabilizing device comprising means for confining said spring means including a yieldable connection between the sprung weight and unsprung weight of the vehicle, means for progressively increasing the magnitude of the confining force of said connection, said last mentioned means being operatively responsive to road imposed movement of said wheels relative to said body, and means for selectively engaging and disengaging said connection.

8. A stabilizing device for a vehicle of the type having a sprung weight portion, an unsprung weight portion, and spring means interposed between said portions, said stabilizing device comprising means for confining said spring means including a yieldable connection between the sprung weight and unsprung weight of the vehicle, means for progressively decreasing the magnitude of the confining force of said connection, said last mentioned means being operatively responsive to road imposed movement of said wheels relative to said body, and means for selectively engaging and disengaging said connection.

9. A stabilizing device for a vehicle of the type having a sprung weight portion, an unsprung weight portion, and spring means interposed between said portions, said stabilizing device comprising a yieldable conection for applying a confining force between the sprung weight and unsprung weight of the vehicle, means for progressively increasing and decreasing the magnitude of the confining force of said connection responsive to relative movement between said sprung and unsprung weight, and means for selectively engaging and disengaging said connection.

10. A stabilizing device for a vehicle of the type having a sprung weight portion, an unsprung weight portion, and spring means interposed between said portions, said stabilizing device comprising yieldable connecting means engageable between the sprung and unsprung weight of the vehicle for maintaining a decreased effect of force exerted by said spring means between said portions when engaged by applying a confining force between said weight portions, means for selectively engaging and disengaging the connecting means, and means for progressively increasing and decreasing the magnitude of the confining force of said connecting means, responsive to engagement, by the vehicle, of protrusions and depressions in the road.

11. A stabilizing device for a vehicle of the type having a sprung weight portion, an unsprung weight portion, and spring means interposed between said portions, said stabilizing device comprising a yieldable connection engageable between the sprung and unsprung weight of the vehicle for maintaining a decreased effect of force exerted by said spring means between said portions when engaged by applying a confining force between said weight portions, means for selectively engaging and disengaging the connection, and, means for progressively increasing the magnitude of the confining force of said connection, in opposition to yielding of the connection upon engagement by the vehicle of protrusions and depressions in the road.

12. A stabilizing device for a vehicle of the type having a sprung weight portion, an unsprung weight portion, and spring means interposed between said portions, said stabilizing device comprising a yieldable connection engageable between the sprung and unsprung weight of the vehicle for maintaining a decreased effect of force exerted by said spring means between said portions when engaged by applying a confining force between said weight portions, means for selectively engaging and disengaging the connection, and means for progressively decreasing the magnitude of the confining force of said connection subsequent to yielding of the connection upon engagement by the vehicle of protrusions and depressions in the road, said letter mentioned means being adapted to increase the magnitude of said force responsive to increase in the yielding of said connection.

References Cited in the file of this patent

UNITED STATES PATENTS

| 1,066,712 | Cooper | July 8, 1913 |
| 2,353,503 | Rost | July 11, 1944 |
| 2,518,733 | Walker | Aug. 15, 1950 |
| 2,577,761 | Hickman | Dec. 11, 1951 |
| 2,578,972 | Hagely | Dec. 18, 1951 |
| 2,644,699 | Weiertz | July 7, 1953 |
| 2,650,108 | Bruce | Aug. 25, 1953 |
| 2,684,254 | Goss | July 20, 1954 |

FOREIGN PATENTS

| 518,848 | Great Britain | Mar. 8, 1940 |